(12) United States Patent
Pei et al.

(10) Patent No.: US 10,890,678 B2
(45) Date of Patent: Jan. 12, 2021

(54) SEISMIC EXPLORATION SYSTEM BASED ON UNDERWATER MOBILE PLATFORM

(71) Applicants: The First Institute of Oceanography, SOA, Qingdao (CN); National Deep Sea Center, Qingdao (CN)

(72) Inventors: Yanliang Pei, Qingdao (CN); Baohua Liu, Qingdao (CN); Qingfeng Hua, Qingdao (CN); Kaiben Yu, Qingdao (CN); Qiuhong Xie, Qingdao (CN); Chunlei Jing, Qingdao (CN); Yifan Huang, Qingdao (CN); Yanhong Lian, Qingdao (CN); Keping Yan, Qingdao (CN)

(73) Assignees: The First Institute of Oceanography, SOA, Qingdao (CN); National Deep Sea Center, Qingdao (CN)

( * ) Notice: Subject to any disclaimer, the term of this patent is extended or adjusted under 35 U.S.C. 154(b) by 315 days.

(21) Appl. No.: 16/083,313

(22) PCT Filed: Jan. 19, 2018

(86) PCT No.: PCT/CN2018/073392
§ 371 (c)(1),
(2) Date: Sep. 7, 2018

(87) PCT Pub. No.: WO2019/127748
PCT Pub. Date: Jul. 4, 2019

(65) Prior Publication Data
US 2019/0369281 A1 Dec. 5, 2019

(30) Foreign Application Priority Data
Dec. 27, 2017 (CN) .......................... 2017 1 1449620

(51) Int. Cl.
*G01V 1/38* (2006.01)
*G01V 1/09* (2006.01)

(52) U.S. Cl.
CPC .............. *G01V 1/3843* (2013.01); *G01V 1/09* (2013.01); *G01V 2210/1293* (2013.01)

(58) Field of Classification Search
CPC .................. G01V 1/3843; G01V 1/09; G01V 2210/1293; G01V 2210/1423;
(Continued)

(56) References Cited

U.S. PATENT DOCUMENTS

2018/0172855 A1* 6/2018 Drange .................... H04Q 9/00
2019/0369281 A1* 12/2019 Pei ........................... G01V 1/09

FOREIGN PATENT DOCUMENTS

CN 103557843 A 2/2014
CN 103890614 A 6/2014
(Continued)

OTHER PUBLICATIONS

Translation of CN103557843 (Year: 2014).*
International Search Report for International Patent Application No. PCT/CN2018/073392 dated Jun. 27, 2018; 5 pages.

*Primary Examiner* — Daniel Pihulic

(57) ABSTRACT

Seismic exploration system based on an underwater mobile platform including: an add-on type electronic cabin, a circuit integration device, an underwater mobile platform, a mounting mechanism, a multi-electrode emission array, and a multi-channel hydrophone linear array; where the electronic cabin is externally fixed on the underwater mobile platform through the mounting mechanism, the circuit integration device is disposed in the electronic cabin, the circuit integration device is connected with the multi-electrode emission array, and the multi-electrode emission array is connected with the multi-channel hydrophone linear array; and the circuit integration device includes a multi-channel
(Continued)

underwater acoustic data acquisition device, a sound source host, a photoelectric junction box and a battery pack, where the acoustic data acquisition device is connected with the sound source host, and the photoelectric junction box is connected with the acoustic data acquisition device, the sound source host, the battery pack, and the multi-electrode emission array, respectively.

10 Claims, 6 Drawing Sheets

(58) Field of Classification Search
CPC ...... G01V 1/3808; G01V 11/00; Y02A 90/30; Y02A 90/342
See application file for complete search history.

(56) References Cited

FOREIGN PATENT DOCUMENTS

| | | | | |
|---|---|---|---|---|
| CN | 104155695 A | 11/2014 | | |
| CN | 104793255 A | 7/2015 | | |
| CN | 106568496 A | 4/2017 | | |
| CN | 207895085 U | * 9/2018 | ............... | G01V 1/09 |
| RU | 2012136491 A | 2/2014 | | |
| WO | WO-2019127748 A1 | * 7/2019 | ............... | G01V 1/09 |

* cited by examiner

SEISMIC EXPLORATION SYSTEM BASED ON UNDERWATER MOBILE PLATFORM

CROSS-REFERENCE TO RELATED APPLICATIONS

This application claims priority to a Chinese patent application No. 201711449620.3 filed to the State Intellectual Property Office on Dec. 27, 2017 and entitled "seismic exploration system based on underwater mobile platform", which is herein incorporated by reference in its entirety.

BACKGROUND OF THE INVENTION

1. Field of Invention

The present invention relates to the technical field of geophysical exploration and investigation, and particularly to a seismic exploration system based on an underwater mobile platform.

2. Background of Related Art

Conventional marine seismic exploration usually uses a sound-source emitting array and a hydrophone towing array which are both towed by a research vessel on the sea surface. Sound waves emitted by the sound source are transmitted by the seawater and reflected by the seabed, and then received and collected by the hydrophone array, so as to analyze and determine the geological conditions of the seabed by further calculating and plotting. When this conventional seismic exploration method works in deep seas, due to the large attenuation of sound waves (especially high-frequency sound waves) by seawater, the exploration resolution and penetration depth of conventional seismic equipment for deep sea formations are reduced, resulting in low exploration accuracy.

SUMMARY OF THE INVENTION

An objective of the present invention is to provide a seismic exploration system based on an underwater mobile platform that can improve the exploration accuracy.

The present invention provides the following solution: A seismic exploration system based on an underwater mobile platform, including: an add-on type electronic cabin, a circuit integration device, an underwater mobile platform, a mounting mechanism, a multi-electrode emission array and a multi-channel hydrophone linear array; where the add-on type electronic cabin is externally fixed on the underwater mobile platform through the mounting mechanism, the circuit integration device is disposed in the add-on type electronic cabin, the circuit integration device is connected with the multi-electrode emission array, and the multi-electrode emission array is connected with the multi-channel hydrophone linear array; and the circuit integration device includes a multi-channel underwater acoustic data acquisition device, a sound source host, a photoelectric junction box, and a battery pack, where the multi-channel underwater acoustic data acquisition device is connected with the sound source host, the photoelectric junction box is connected with the multi-channel underwater acoustic data acquisition device, the sound source host, the battery pack and the multi-electrode emission array respectively, the multi-channel underwater acoustic data acquisition device is configured to acquire underwater acoustic data received by the multi-channel hydrophone linear array, the sound source host is configured to control the multi-electrode emission array to excite sound waves by discharge, and the photoelectric junction box is configured to transfer the received optical or electrical signals and manage the battery pack.

Optionally, the system further includes a photoelectric composite cable, the circuit integration device is connected with the multi-electrode emission array through the photoelectric composite cable, and the photoelectric composite cable is connected with the multi-channel hydrophone linear array through the multi-electrode emission array.

Optionally, the system further includes a tail hitching rod, one end of the tail hitching rod is connected fixedly with the tail portion of the underwater mobile platform, the other end of the tail hitching rod is hitched to the photoelectric composite cable, and the tail hitching rod is configured to withstand the towing force of the photoelectric composite cable, the multi-electrode emission array and the multi-channel hydrophone linear array during the navigation process of the underwater mobile platform.

Optionally, the multi-channel underwater acoustic data acquisition device includes: a microprocessor, a logic controller, an optical fiber data transmission interface, a peripheral sensor, a build-in-test device, a clock management module, a sound source host interface, an Ethernet interface, and a storage management module; where the microprocessor is connected with the underwater mobile platform, the logic controller, the peripheral sensor, the sound source host interface, and the Ethernet interface respectively, the sound source host interface is connected with the sound source host, and the microprocessor is configured to send a preset parameter configured by a user to the logic controller and the multi-channel hydrophone linear array while transmitting a trigger signal to the sound source host and the multi-channel hydrophone linear array, to send the data received from the peripheral sensor to the logic control module, and receive the data sent by the logic controller in real time, and to send the data in real time through the Ethernet interface, where the preset parameter includes a preset interval, a preset sampling rate, and a preset recording length; the logic controller is connected with the optical fiber data transmission interface, the build-in-test device, the clock management module, and the storage management module respectively, where the optical fiber data transmission interface is connected with the photoelectric junction box, and the logic controller is configured to receive seismic data sent by the multi-channel hydrophone linear array, to parse the seismic data, to send the parsed seismic data to the microprocessor module and the storage management module; the optical fiber data transmission interface is configured to conduct photovoltaic conversion; the peripheral sensor includes a depth sensor, a height sensor, a temperature sensor, and an attitude sensor; the build-in-test module is configured to conduct monitoring and testing in real time; the clock management module uses a high-precision crystal oscillator or an atomic clock as a clock source of the system; the sound source host interface is configured to output a trigger pulse signal to the sound source host and set an excitation energy parameter for the sound source host; the Ethernet interface is configured to connect a higher-level control device; and the storage management module is configured to store the parsed seismic data.

Optionally, the sound source host includes: a central controller, a charging control circuit, a sampling circuit, a discharge switch control circuit, a serial interface, and a photoelectric isolation interface which are all connected to the central controller, a boost rectifier charging circuit, an energy-storage capacitor bank, and an all-solid-state discharge switch; where the energy-storage capacitor bank is connected to the boost rectifier charging circuit, the all-solid-state discharge switch, and the sampling circuit respectively, the boost rectifier charging circuit is connected with the charging control circuit, the all-solid-state discharge switch is connected with the discharge switch control circuit, the all-solid-state discharge switch is connected with the photoelectric junction box, and both the serial interface and the photoelectric isolation interface are connected with the multi-channel underwater acoustic data acquisition device; the central controller is configured to control the charging control circuit to start or end charging, and to control the discharge switch control circuit to close the discharge switch; the boost rectifier charging circuit is configured to charge the energy-storage capacitor bank; the energy-storage capacitor bank consists of multiple pulse energy-storage capacitors; the all-solid-state discharge switch is configured to realize a monopulse rapid discharge of the energy-storage capacitor bank; the charging control circuit is configured to start or stop charging according to a command from the central controller; the sampling circuit is configured to conduct partial pressure sampling of the voltage of the energy-storage capacitor bank, so as to obtain a capacitor voltage value and transmit the capacitor voltage value to the central controller; the discharge switch control circuit is configured to control electric energy release of the energy-storage capacitor bank; the serial interface is configured for the communication between the sound source host and the multi-channel underwater acoustic data acquisition device; the photoelectric isolation interface is configured to receive an external trigger signal and send the external trigger signal to the central controller; and the wireless network interface is configured to receive a sound source parameter set by a user, and transmit the sound source parameter to the central controller, where the sound source parameter includes excitation energy, a working mode, an excitation interval, and a work schedule, and the wireless network interface is a Bluetooth interface or a WIFI interface.

Optionally, the multi-electrode emission array includes a high-voltage electrode array, a metal frame, a sound-permeable pressure-resistant barrel, and a first buoyancy column, a second buoyancy column, a high pressure adapter box, and an electrolyte solution; the sound-permeable pressure-resistant barrel is filled with the electrolyte solution, and the high-voltage electrode array and the metal frame are both immersed in the electrolyte solution, the high-voltage adapter box is located on the upper portion of the sound-permeable pressure-resistant barrel, the first buoyancy column is located at the head end of the sound-permeable pressure-resistant barrel, the second buoyancy column is located at the tail end of the sound-permeable pressure-resistant barrel, both the first buoyancy column and the second buoyancy column are connected fixedly with the sound-permeable pressure-resistant barrel, the high-voltage electrode array is connected with a high-potential wire, and the metal frame is connected with a zero-potential wire; the high-voltage electrode array includes multiple high-voltage discharge electrodes which serve as a high-voltage potential for discharge of the multi-electrode emission array; the metal frame is used as a zero potential of discharge of the multi-electrode emission array; the sound-permeable pressure-resistant barrel is configured to isolate from a deep-water environment under a high hydrostatic pressure, so that the high-voltage electrode array and the metal frame are in a normal pressure environment; the first buoyancy column and the second buoyancy column are both configured to offset the weights of the high-voltage electrode array and the metal frame; the electrolyte solution is configured as a discharge channel between the high voltage potential and the zero potential of the multi-electrode emission array; and the high-voltage adapter box is configured to adapt a high voltage.

Optionally, the multi-channel hydrophone linear array includes a photoelectric conversion package, a front elastic section, a working section, a digital package, and a rear elastic section; where the photoelectric composite cable is connected with the front elastic segment through the photoelectric conversion package, the front elastic segment is connected with the working segment through the digital package, multiple working segments are connected with each other through the digital package, and the working segment is connected with the rear elastic segment through the digital package; the photoelectric conversion package is configured to convert the seismic data acquired by the multi-channel hydrophone linear array and the state information thereof into a fiber-optic signal, and to convert the control information sent by the multi-channel underwater acoustic data acquisition device to the multi-channel hydrophone linear array into an electrical signal; the front elastic section is configured to isolate from the mechanical vibration generated by the underwater mobile platform and the multi-electrode emission array, and the working segment includes multiple hydrophones for acquiring a hydroacoustic signal and converting the hydroacoustic signal into an analog electrical signal; the digital package is configured to convert the analog electrical signal into a digital electrical signal; and the rear elastic section is configured to isolate from the noise at the tail portion.

Optionally, the material of the sound-permeable pressure-resistant barrel is a carbon fiber material; and the materials of both the first buoyancy column and the second buoyancy column are glass-bead buoyancy materials. Optionally, the multi-channel hydrophone linear array further includes a drag parachute, the drag parachute is connected with the rear elastic section so as to maintain the attitude of the multi-channel hydrophone linear array. Optionally, the add-on type electronic cabin, the underwater mobile platform and the photoelectric composite cable are all connected through a watertight connector. Compared with the prior art, the disclosure has the following advantages.

The seismic exploration system based on the underwater mobile platform of the present invention includes an add-on type electronic cabin, a circuit integration device, an underwater mobile platform, a mounting mechanism, a multi-electrode emission array, and a multi-channel hydrophone linear array; where the add-on type electronic cabin is externally fixed on the underwater mobile platform through the mounting mechanism, the circuit integration device is disposed in the add-on type electronic cabin, the circuit integration device is connected with the multi-electrode emission array, and the multi-electrode emission array is connected with the multi-channel hydrophone linear array; and the circuit integration device includes a multi-channel underwater acoustic data acquisition device, a sound source host, a photoelectric junction box and a battery pack, where the multi-channel underwater acoustic data acquisition device is connected with the sound source host, and the photoelectric junction box is connected with the multi-channel underwater acoustic data acquisition device, the sound source host, the battery pack, and the multi-electrode emission array, respectively. The seismic exploration system can be conveniently applied to the underwater mobile platform. When seismic exploration operations are carried out in deep seas, since the sound sources are towed near the seabed, the large attenuation of sound waves (especially high-frequency sound waves) by seawater at a great depth is avoided as compared with sound sources at the surface of the sea, which improves the seismic exploration resolution and increases the penetration depth of the formation, thereby improving the exploration accuracy; and the multi-electrode emission array is towed behind an underwater vehicle to reduce the vibration of and the interference to the vehicle in the underwater mobile platform by sound source emission, and thus sound waves of high sound source levels can be emitted.

BRIEF DESCRIPTION OF THE DRAWINGS

The present invention will be explained in detail with reference to the accompanying drawings.

DETAILED DESCRIPTION

The following describes in detail the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art without creative efforts on the basis of the embodiments of the disclosure shall fall within the scope of protection of the disclosure.

Figure 1:
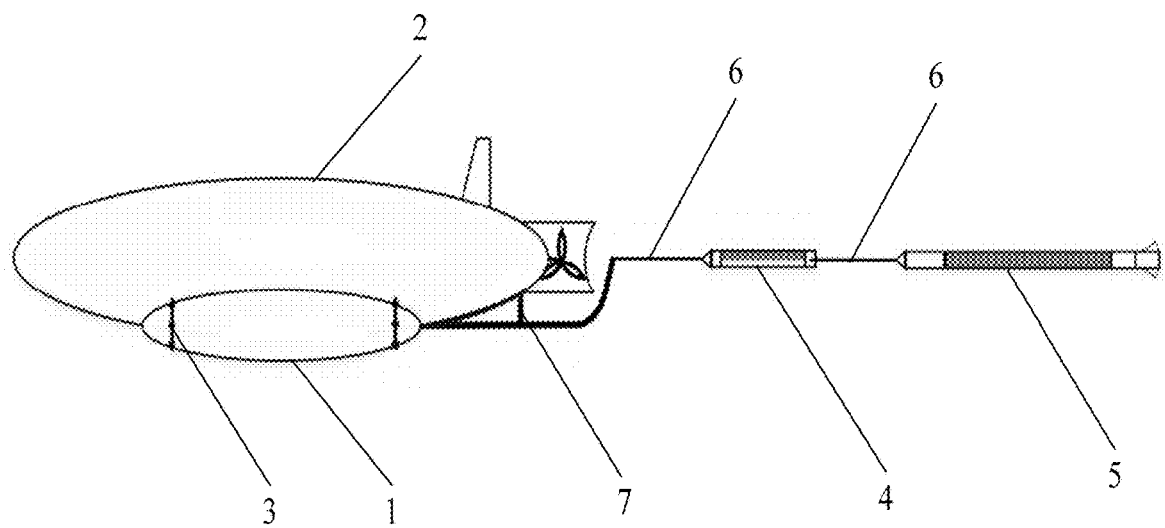
FIG. 1 is a schematic structural diagram of a seismic exploration system based on an underwater mobile platform according to an embodiment of the present invention.
Figure 2:
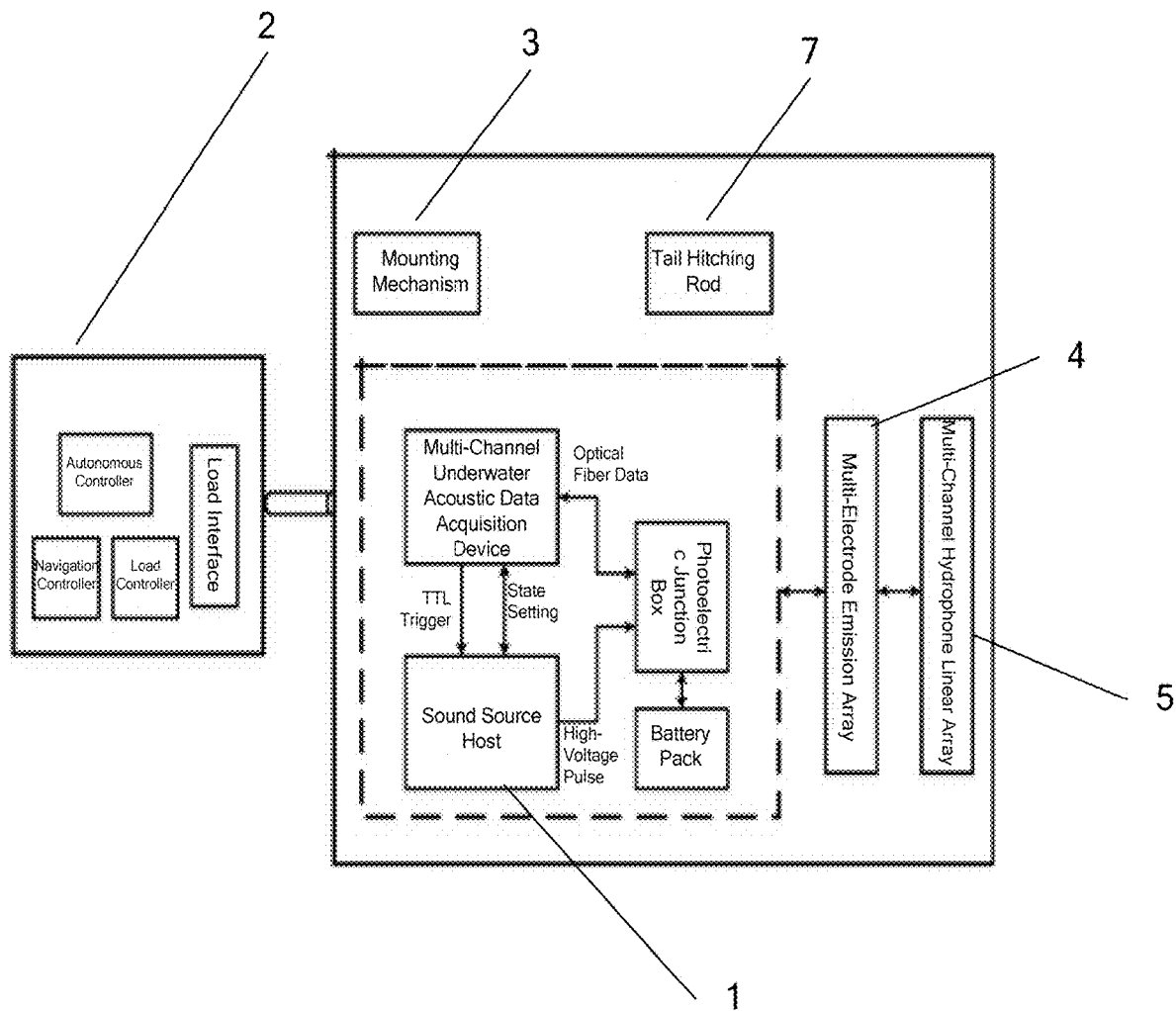
FIG. 2 is a system block diagram of a seismic exploration system based on an underwater mobile platform according to an embodiment of the present invention.

FIG. 1 shows a seismic exploration system based on an underwater mobile platform according to an embodiment of the present invention, and FIG. 2 is a system block diagram of a seismic exploration system based on an underwater mobile platform according to an embodiment of the present invention Referring to FIGS. 1 and 2, the seismic exploration system based on the underwater mobile platform according to the embodiment includes: an add-on type electronic cabin 1, a circuit integration device, an underwater mobile platform 2, a mounting mechanism 3, a multi-electrode emission array 4, a multi-channel hydrophone linear array 5, a photoelectric composite cable 6, and a tail hitching rod 7.

The add-on type electronic cabin 1 is externally fixed on the underwater mobile platform 2 through the mounting mechanism 3, the circuit integration device is disposed in the add-on type electronic cabin 1, the circuit integration device is connected with the multi-electrode emission array 4 through the photoelectric composite cable 6, the multi-electrode emission array 4 is connected with the multi-channel hydrophone linear array 5 through the photoelectric composite cable 6, the L-shaped or Z-shaped tail hitching rod 7 is disposed at a tail portion of the underwater mobile platform 2, one end of the tail hitching rod 7 is connected fixedly with the tail portion of the underwater mobile platform 2, the other end of the tail hitching rod 7 is hitched to the photoelectric composite cable 6, and the tail hitching rod 7 is configured to withstand the towing force of the photoelectric composite cable 6, the multi-electrode emission array 4 and the multi-channel hydrophone linear array 5 during the navigation process of the underwater mobile platform.

The underwater mobile platform 2 includes an autonomous controller, a navigation controller, a load controller and a load interface, where the load interface of the underwater mobile platform 2 is connected with the circuit integration device through a watertight connector, and the underwater mobile platform 2 can be underwater vehicles of a variety of types, such as an autonomous underwater vehicle, a remotely-operated unmanned underwater vehicle, an underwater glider, and the like. When the underwater mobile platform 2 is navigated under water, the multi-channel hydrophone linear array 5 is towed to the tail portion of the underwater mobile platform 2, and the multi-channel hydrophone linear array 5 is of a nearly horizontal state.

The circuit integration device includes a multi-channel underwater acoustic data acquisition device, a sound source host, a photoelectric junction box, and a battery pack, where the multi-channel underwater acoustic data acquisition device is connected with the sound source host, the photoelectric junction box is connected with the multi-channel underwater acoustic data acquisition device, the sound source host, the battery pack and the multi-electrode emission array 4 respectively, the multi-channel underwater acoustic data acquisition device is configured to acquire underwater acoustic data received by the multi-channel hydrophone linear array 5, the sound source host is configured to control the multi-electrode emission array 4 to excite sound waves by discharge, and the photoelectric junction box is configured to transfer the received optical or electrical signals and manage the battery pack.

Figure 3:
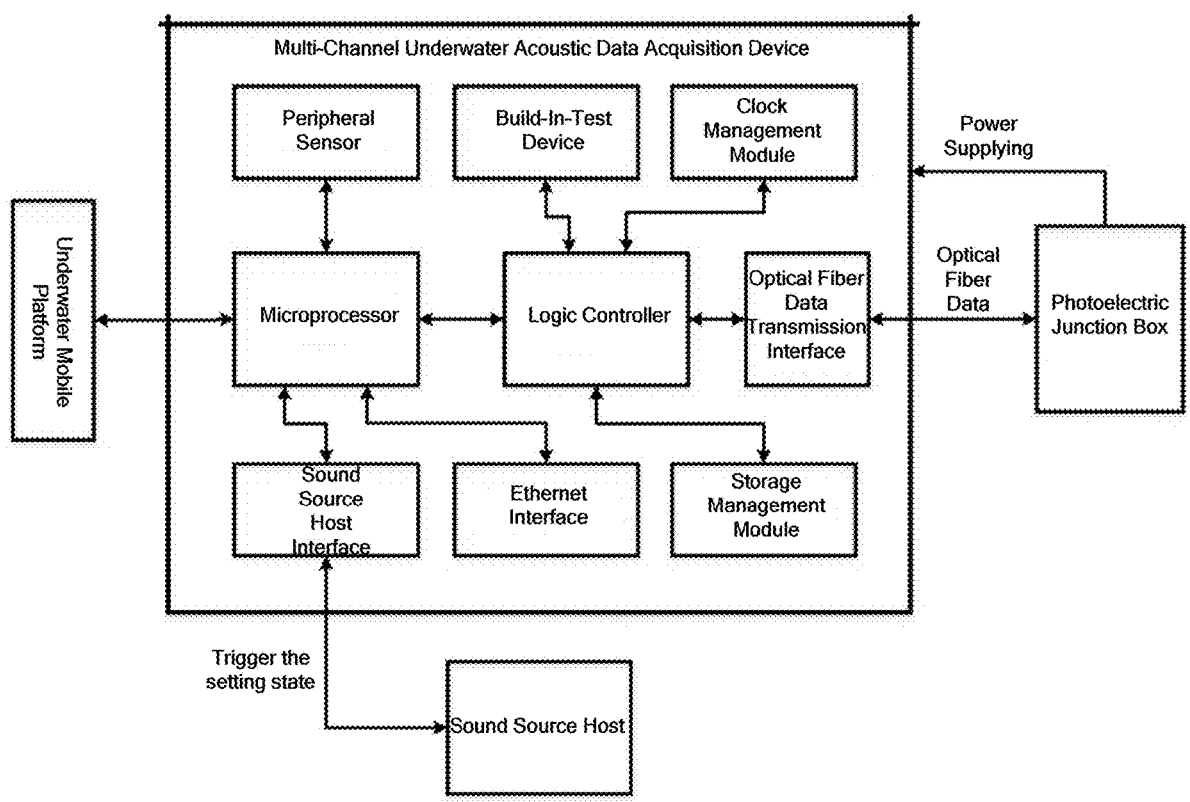
FIG. 3 is a structural block diagram of a multi-channel underwater acoustic data acquisition device in a seismic exploration system based on an underwater mobile platform according to an embodiment of the present invention.

FIG. 3 is a structural block diagram of a multi-channel underwater acoustic data acquisition device in a seismic exploration system based on an underwater mobile platform according to an embodiment of the present invention. Referring to FIG. 3, the multi-channel underwater acoustic data acquisition device includes: a microprocessor, a logic controller, an optical fiber data transmission interface, a peripheral sensor, a build-in-test device, a clock management module, a sound source host interface, an Ethernet interface, and a storage management module.

The microprocessor is the core of the multi-channel underwater acoustic data acquisition device, the microprocessor is connected with the underwater mobile platform 2, the logic controller, the peripheral sensor, the sound source host interface, and the Ethernet interface respectively, the sound source host interface is connected with the sound source host, and the microprocessor is configured to send a preset parameter configured by a user to the logic controller and the multi-channel hydrophone linear array 5 while transmitting a trigger signal to the sound source host and the multi-channel hydrophone linear array 5, where the preset parameter includes a preset using interval, a preset sampling rate, and a preset recording length; to send the data received from the peripheral sensor to the logic control module, and receive the data sent by the logic controller in real time; and to send the data in real time through the Ethernet interface.

The logic controller is connected with the optical fiber data transmission interface, the build-in-test device, the clock management module, and the storage management module respectively, where the optical fiber data transmission interface is connected with the photoelectric junction box, and the logic controller is configured to receive seismic data sent by the multi-channel hydrophone linear array 5; to parse the seismic data, parsing including data verification and rearrangement, and identification and processing works of partial control information; to send the parsed seismic data to the microprocessor module on one hand, and to send the parsed seismic data to the storage management module for local data storage on the other hand.

The optical fiber data transmission interface is configured to conduct photovoltaic conversion, to convert downlink command data into an optical signal, and to convert uplink seismic data and state data into electrical signals. The peripheral sensor includes a depth sensor, a height sensor, a temperature sensor, and an attitude sensor. The build-in-test module is configured to monitor and test various key parts in real time, including monitoring of the power system, monitoring of the storage system, monitoring of the communication system, and monitoring of the task command. The clock management module uses a high-precision crystal oscillator or an atomic clock as a clock source of the system, to ensure the time accuracy of the seismic data acquired by the seismic system. The sound source host interface includes signals on two channels, one channel is to output an TTL trigger pulse signal to the sound source host, and the other channel is to set an excitation energy parameter for the sound source host and monitor the working state of the sound source host. The Ethernet interface is an external interface of the control system and is configured to connect a higher-level control device, and the uploading of data and the acquisition of control command are also performed through the Ethernet interface. The storage management module includes a high speed storage array and an array management circuit thereof, where the data storage array may be an SD card, a hard disk, or other devices, and the storage management module is configured to store the parsed seismic data.

The multi-channel underwater acoustic data acquisition device of this example can operate in an automatic mode or in a controlled mode. When the multi-channel underwater acoustic data acquisition device works in the autonomous mode, underwater acoustic data acquisition is conducted automatically with a fixed using interval as set, according to an using interval, a sampling rate, a sampling length, and the like parameters set by a user in advance; and when the multi-channel underwater acoustic data acquisition device works in the controlled mode, the underwater mobile platform 2 sets and controls the multi-channel underwater acoustic data acquisition device through the load interface. Specifically, the underwater mobile platform 2 sets the using interval, the sampling rate, the sampling length and the like parameters of the multi-channel underwater acoustic data acquisition device, and the underwater mobile platform 2 controls the activation and deactivation of the multi-channel underwater acoustic data acquisition device.

Figure 4:
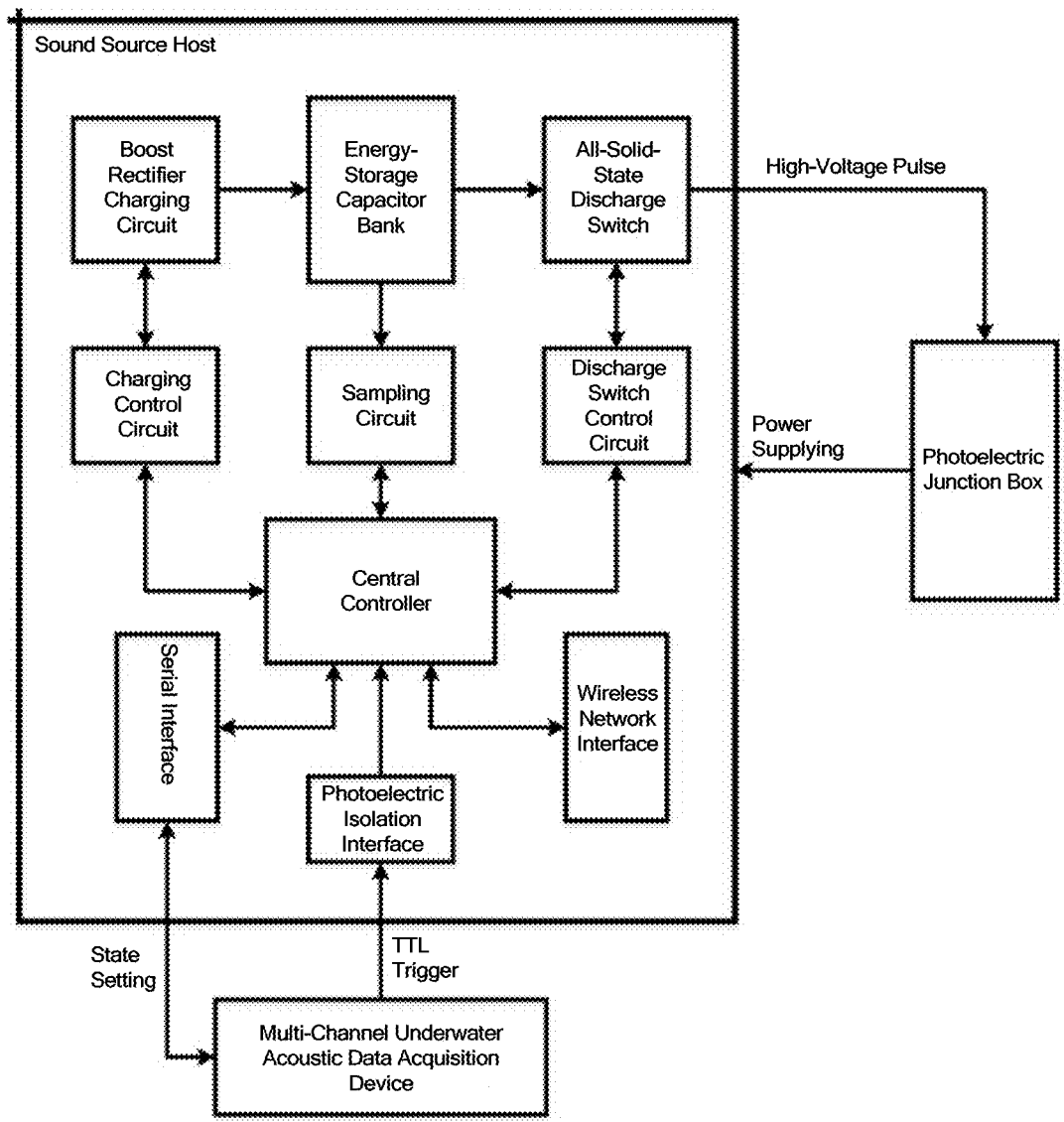
FIG. 4 is a structural block diagram of a sound source host in a seismic exploration system based on an underwater mobile platform according to an embodiment of the present invention.

FIG. 4 is a structural block diagram of a sound source host in a seismic exploration system based on an underwater mobile platform according to an embodiment of the present invention. Referring to FIG. 4, the sound source host includes: a central controller, a charging control circuit, a sampling circuit, a discharge switch control circuit, a serial interface, and a photoelectric isolation interface which are all connected to the central controller, a boost rectifier charging circuit, an energy-storage capacitor bank, and an all-solid-state discharge switch.

The energy-storage capacitor bank is connected to the boost rectifier charging circuit, the all-solid-state discharge switch, and the sampling circuit respectively, the boost rectifier charging circuit is connected with the charging control circuit, the all-solid-state discharge switch is connected with the discharge switch control circuit, the all-solid-state discharge switch is connected with the photoelectric junction box, and both the serial interface and the photoelectric isolation interface are connected with the multi-channel underwater acoustic data acquisition device.

The central controller controls the charging control circuit the to start or end charging according to the excitation energy set by the user and the voltage on the energy-storage capacitor bank; controls the discharge switch control circuit to close the all-solid-state discharge switch according to the received trigger signal in an external trigger mode; controls the discharge switch control circuit to close the all-solid-state discharge switch according to a time interval set by the user in an internal trigger mode; acquires and stores the working state of the system.

The boost rectifier charging circuit includes inverting, boosting, and rectifying the DC power of the battery pack, such that the DC power of the battery pack is converted into a high-voltage DC power source to charge the energy-storage capacitor bank. The energy-storage capacitor bank consists of multiple pulse energy-storage capacitors. The all-solid-state discharge switch includes a thyristor and a freewheel diode, where the thyristor has a unidirectional conduction characteristic, the thyristor cooperates with the freewheeling diode, and the all-solid-state discharge switch is configured to realize a monopulse rapid discharge of the energy-storage capacitor bank. The charging control circuit is configured to start or stop charging according to a command from the central controller. The sampling circuit is configured to conduct partial pressure sampling of the voltage of the energy-storage capacitor bank, so as to obtain a capacitor voltage value and transmit the capacitor voltage value to the central controller. The discharge switch control circuit generates an instantaneous large current when receiving the trigger signal, such that the thyristor is turned on and the energy-storage capacitor bank releases electric energy.

The serial interface is responsible for the communication between the sound source host and the multi-channel underwater acoustic data acquisition device, the multi-channel underwater acoustic data acquisition device sets parameters of the sound source host through the serial interface, and the state information of the sound source host is sent to the multi-channel underwater acoustic data acquisition device through the serial interface.

The photoelectric isolation interface is configured to receive an external trigger signal and send the external trigger signal to the central controller, and the external trigger signal may come from an underwater vehicle or other devices; and the photoelectric isolation can avoid the interference and damage to the underwater vehicle or other devices by the high voltage in the sound source host.

The wireless network interface may be a Bluetooth interface or a WIFI interface, may be connected with a computer or a mobile phone, and is configured to set a sound source parameter by the user, and to monitor the running state of the sound source in real time if necessary, where the sound source parameter includes excitation energy, a working mode, an excitation interval, and a work schedule. The user not only can set the sound source host individually through the wireless network interface, but also can set the sound source host indirectly through the multi-channel underwater acoustic data acquisition device, the two manners having the same priority level.

The photoelectric junction box is configured to transfer optical and electrical information between the multi-channel underwater acoustic data acquisition device, the sound source host and the photoelectric composite cable. The photoelectric junction box further includes a power management module, where the power management module manages the battery pack to prevent overcharging and over-discharging of the battery pack and improve the service life of the battery pack; and meanwhile generates and supplies a low-voltage DC power source with an appropriate volume to a control circuit such as the multi-channel underwater acoustic data acquisition device and the sound source host after the voltage of the battery pack is isolated and converted. The battery pack supplies power to all components.

Figure 5:
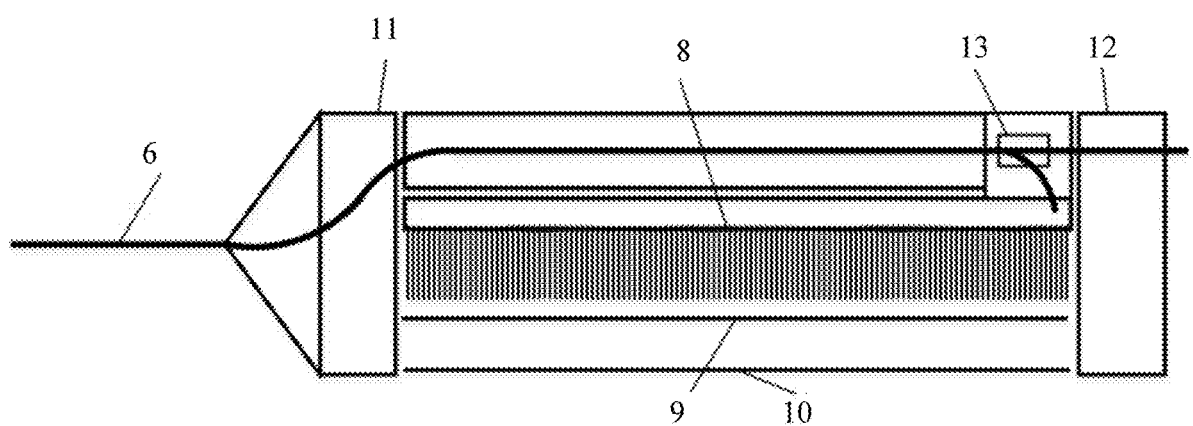
FIG. 5 is a schematic structural diagram of a multi-electrode emission array in a seismic exploration system based on an underwater mobile platform according to an embodiment of the present invention.

FIG. 5 is a schematic structural diagram of a multi-electrode emission array in a seismic exploration system based on an underwater mobile platform according to an embodiment of the present invention. Referring to FIG. 5, the multi-electrode emission array 4 includes a high-voltage electrode array 8, a metal frame 9, a sound-permeable pressure-resistant barrel 10, a first buoyancy column 11, a second buoyancy column 12, a high-voltage adapter box 13, and an electrolyte solution.

The sound-permeable pressure-resistant barrel 10 is filled with the electrolyte solution, and the high-voltage electrode array 8 and the metal frame 9 are both immersed in the electrolyte solution, the electrolyte solution is seawater, the high-voltage adapter box 13 is located on the upper portion of the sound-permeable pressure-resistant barrel 10, the first buoyancy column 11 is located at the head end of the sound-permeable pressure-resistant barrel 10, the second buoyancy column 12 is located at the tail end of the sound-permeable pressure-resistant barrel 10, both the first buoyancy column 11 and the second buoyancy column 12 are connected fixedly with the sound-permeable pressure-resistant barrel 10, the high-voltage electrode array 8 is connected with a high-potential wire, and the metal frame 9 is connected with a zero-potential wire.

The high-voltage electrode array 8 includes multiple high-voltage discharge electrodes which serve as a high-voltage potential for discharge of the multi-electrode emission array 4. The metal frame 9 is used as a zero potential of discharge of the multi-electrode emission array 4. The material of the sound-permeable pressure-resistant barrel 10 is a carbon fiber material for isolating from a deep-water environment under a high hydrostatic pressure, so that the high-voltage electrode array 8 and the metal frame 9 are in a normal pressure environment. In a normal-pressure environment, the electroacoustic conversion performances of the high-voltage electrode array 8 and the metal frame 9 are more suitable for marine seismic exploration. The sound-permeable pressure-resistant barrel 10 not only has a seal compression resistance performance, but also has good sound permeability. The sound-permeable pressure-resistant barrel 10 of this example can work in a hydrostatic-pressure environment with a water depth of 2000 m.

The materials of both the first buoyancy column 11 and the second buoyancy column 12 are glass-bead buoyancy materials, and the first buoyancy column 11 and the second buoyancy column 12 are both configured to offset the weights of the high-voltage electrode array 8 and the metal frame 9, such that the entirety of the multi-electrode emission array 4 exhibits approximately zero buoyancy. The electrolyte solution is configured as a discharge channel between the high voltage potential and the zero potential of the multi-electrode emission array 4. The high-voltage adapter box 13 is configured to adapt a high voltage.

Figure 6:
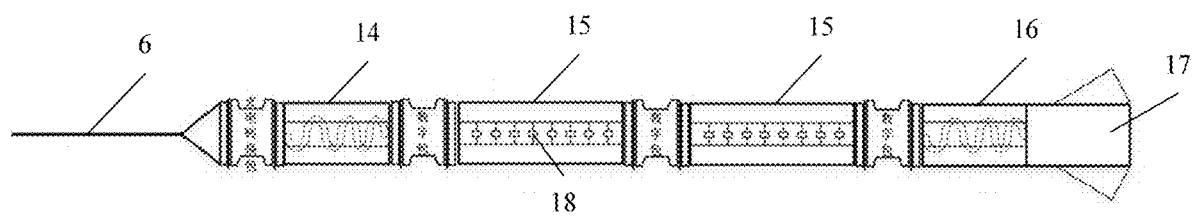
FIG. 6 is a schematic structural diagram of a multi-channel hydrophone linear array in a seismic exploration system based on an underwater mobile platform according to an embodiment of the present invention.

FIG. 6 is a schematic structural diagram of a multi-channel hydrophone linear array in a seismic exploration system based on an underwater mobile platform according to an embodiment of the present invention. Referring to FIG. 6, the multi-channel hydrophone linear array 5 includes a photovoltaic conversion package, a front elastic section 14, a working section 15, a digital package, a rear elastic section 16, and a drag parachute 17. The front elastic section 14 is connected with the photoelectric composite cable 6 through the photoelectric conversion package, and the photoelectric conversion package can convert the seismic data acquired by the multi-channel hydrophone linear array 5 and the state information thereof from an electrical signal into a fiber-optic signal, and can also convert the control information sent by the multi-channel underwater acoustic data acquisition device to the multi-channel hydrophone linear array 5 from a fiber-optic signal into an electrical signal.

The front elastic section 14 is configured to isolate from the mechanical vibration generated by the underwater mobile platform and the multi-electrode emission array, and to attenuate the interference to the working section 15 by the mechanical vibration. The multi-channel hydrophone linear array 5 includes at least one working section 15, where each working section 15 includes at least one set of hydrophones; each set of hydrophones is one hydroacoustic channel; each set of hydrophones at least includes one hydrophone 18; when one set of hydrophones includes multiple hydrophones 18, the multiple hydrophones 18 in the set are arranged with the same or different pitch; and the multiple hydrophones 18 are connected in parallel or in series. The front elastic section 14 is connected with the working section 15 through the digital package, multiple working sections 15 are connected with each other through the digital package, the working section 15 is connected with the rear elastic section through the digital package, and the digital package is configured to convert an analog electrical signal into a digital electrical signal. The rear elastic section 16 is configured to isolate from the noise at the tail portion. The drag parachute 17 is connected with the rear elastic section 16, so as to maintain the attitude of the multi-channel hydrophone linear array 5. The interior of the multi-channel hydrophone linear array 5 is filled with a liquid, colloidal or solid buoyancy material that imparts a weak positive buoyancy to the overall system.

The photoelectric composite cable 6 of this example is externally reinforced by aramid fiber material such as KEVLAR, and is responsible for transmitting optical and electrical signals, where the optical and electrical signals include: (1) the high voltage and high current pulse signals generated by rapid discharge of the energy-storage capacitor bank in the sound source host; (2) the DC power supply for powering the multi-channel hydrophone linear array; (3) seismic data acquired by the multi-channel hydrophone linear array and state information thereof, which is a fiber-optic signal; and (4) the control information sent by the multi-channel underwater acoustic data acquisition device to the multi-channel hydrophone linear array, which is a fiber-optic signal.

The photoelectric composite cable 6 is configured to tow the multi-electrode emission array and the multi-channel hydrophone linear array 5, and can withstand a large pulling force; is configured to isolate from the mechanical vibration generated by the multi-electrode emission array, so as to prevent the interference to the underwater mobile platform 2 by the vibration during the discharge excitation of the multi-electrode emission array 4; and is configured to isolate from the electromagnetic interference generated by the multi-electrode emission array, so as to prevent the interference to the underwater mobile platform 2 by the strong electromagnetic waves during the discharge excitation of the multi-electrode emission array 4.

The seismic exploration system based on the underwater mobile platform described in the above embodiments has the following specific working process in actual application: (1) the research vessel arrives at an established working sea area; (2) through the Ethernet interface, on one hand the user sets working parameters (e.g., a sampling interval, a sampling rate, a sampling length, and the like working parameters) for the multi-channel underwater acoustic data acquisition device and sets the multi-channel underwater acoustic data acquisition device into an automatic working mode, and the testing apparatus is in a normal working state; and on the other hand, the user sets working parameters (e.g., excitation energy, a working mode, an excitation interval, a work schedule, and the like working parameters) of the sound source host indirectly, the sound source host is set into an internal trigger working mode, and the testing apparatus is in a normal working state; (3) the add-on type electronic cabin equipped with the circuit integration device is mounted onto the autonomous underwater vehicle through the mounting mechanism; (4) the multi-electrode emission array and the multi-channel hydrophone linear array are mounted through the tail hitching rod onto the tail portion of the autonomous underwater vehicle, the multi-electrode emission array and the multi-channel hydrophone linear array are connected with the add-on type electronic cabin through the photoelectric composite cable, and the photoelectric composite cable, the multi-electrode emission array and the multi-channel hydrophone linear array are all towed at the tail portion of the autonomous underwater vehicle and of a horizontal state; (5) the parameters of the autonomous underwater vehicle are set, and the autonomous underwater vehicle is deployed onto the surface of sea, so that the autonomous underwater vehicle navigates according to the working parameters, working depth and working route as set; (6) when the autonomous underwater vehicle reaches a specified depth, the sound source host controls the multi-electrode emission array to start work, such that the multi-electrode emission array emits sound waves (artificially-sourced seismic waves) according to a predetermined excitation interval; (7) the emitted sound waves are reflected by the formations, and then received by the multi-channel hydrophone linear array; (8) the multi-channel hydrophone linear array sends the received sound waves as reflected by the formations to the multi-channel acquisition device in the add-on type electronic cabin, the logic control module in the multi-channel acquisition device parses the data and sends the parsed data to the microprocessor module and the storage management module, the microprocessor module sends the parsed data to a control device of a higher level in real time through the Ethernet interface, and the storage management module stores the parsed data locally; (9) after the work is finished, the sound source host is turned off, the multi-channel underwater acoustic data acquisition device is turned off, and the control device of the higher level commands the autonomous underwater vehicle to return to the water surface and to reach the vicinity of the research vessel; (10) the autonomous underwater vehicle and multi-electrode emission array are recycled onto the deck of the research vessel; and (11) the battery packs in the autonomous underwater vehicle and the add-on type electronic cabin are charged to prepare for deployment works of the next stage.

The seismic exploration system based on an underwater mobile platform of this example has the following advantages. (1) the system can be conveniently applied to the underwater mobile platform; (2) when seismic exploration operations are carried out in deep seas, since the sound sources are towed near the seabed, the large attenuation of sound waves (especially high-frequency sound waves) by seawater at a great depth is avoided as compared with sound sources at the surface of the sea, which improves the seismic exploration resolution and increases the penetration depth of the formation; (3) the multi-electrode emission array is towed behind the underwater vehicle to reduce the vibration of and the interference to the vehicle by sound source emission, and thus sound waves of high sound source levels can be emitted; and (4) the use of the sound-permeable pressure-resistant barrel allows the apparatus to be used under conditions of deep water and high hydrostatic pressure, and the generated acoustic signal spectrum is considerable to the sound source level and spectrum generated near the sea surface.

The embodiments of the disclosure are described in detail above with reference to the accompanying drawings, but the disclosure is not limited to the above embodiments. Within the knowledge of a person of ordinary skill in the art, various variations can also be made without departing from the spirit of the disclosure.

We claim:

1. A seismic exploration system based on an underwater mobile platform, comprising:
   an add-on type electronic cabin, a circuit integration device, an underwater mobile platform, a mounting mechanism, a multi-electrode emission array and a multi-channel hydrophone linear array;
   wherein the add-on type electronic cabin is externally fixed on the underwater mobile platform through the mounting mechanism, the circuit integration device is disposed in the add-on type electronic cabin, the circuit integration device is connected with the multi-electrode emission array, and the multi-electrode emission array is connected with the multi-channel hydrophone linear array; and
   the circuit integration device comprises a multi-channel underwater acoustic data acquisition device, a sound source host, a photoelectric junction box, and a battery pack, wherein the multi-channel underwater acoustic data acquisition device is connected with the sound source host, the photoelectric junction box is connected with the multi-channel underwater acoustic data acquisition device, the sound source host, the battery pack and the multi-electrode emission array respectively, the multi-channel underwater acoustic data acquisition device is configured to acquire underwater acoustic data received by the multi-channel hydrophone linear array, the sound source host is configured to control the multi-electrode emission array to excite sound waves by discharge, and the photoelectric junction box is configured to transfer the received optical or electrical signals and manage the battery pack.

2. The seismic exploration system based on the underwater mobile platform of claim 1, wherein the system further comprises a photoelectric composite cable, the circuit integration device is connected with the multi-electrode emission array through the photoelectric composite cable, and the photoelectric composite cable is connected with the multi-channel hydrophone linear array through the multi-electrode emission array.

3. The seismic exploration system based on the underwater mobile platform of claim 2, wherein the system further comprises a tail hitching rod, one end of the tail hitching rod is connected fixedly with the tail portion of the underwater mobile platform, the other end of the tail hitching rod is hitched to the photoelectric composite cable, and the tail hitching rod is configured to withstand the towing force of the photoelectric composite cable, the multi-electrode emission array and the multi-channel hydrophone linear array during the navigation process of the underwater mobile platform.

4. The seismic exploration system based on the underwater mobile platform of claim 1, wherein the multi-channel underwater acoustic data acquisition device comprises:
   a microprocessor, a logic controller, an optical fiber data transmission interface, a peripheral sensor, a build-in-test device, a clock management module, a sound source host interface, an Ethernet interface, and a storage management module;
   wherein the microprocessor is connected with the underwater mobile platform, the logic controller, the peripheral sensor, the sound source host interface, and the Ethernet interface respectively, the sound source host interface is connected with the sound source host, and the microprocessor is configured to send a preset parameter configured by a user to the logic controller and the multi-channel hydrophone linear array while transmitting a trigger signal to the sound source host and the multi-channel hydrophone linear array, to send the data received from the peripheral sensor to the logic control module, and receive the data sent by the logic controller in real time, and to send the data in real time through the Ethernet interface, wherein the preset parameter comprises a preset interval, a preset sampling rate, and a preset recording length;
   the logic controller is connected with the optical fiber data transmission interface, the build-in-test device, the clock management module, and the storage management module respectively, where the optical fiber data transmission interface is connected with the photoelectric junction box, and the logic controller is configured to receive seismic data sent by the multi-channel hydrophone linear array, to parse the seismic data, to send the parsed seismic data to the microprocessor module and the storage management module;
   the optical fiber data transmission interface is configured to conduct photovoltaic conversion;
   the peripheral sensor comprises a depth sensor, a height sensor, a temperature sensor, and an attitude sensor;
   the build-in-test module is configured to conduct monitoring and testing in real time;
   the clock management module uses a high-precision crystal oscillator or an atomic clock as a clock source of the system;
   the sound source host interface is configured to output a trigger pulse signal to the sound source host and set an excitation energy parameter for the sound source host;
   the Ethernet interface is configured to connect a higher-level control device; and
   the storage management module is configured to store the parsed seismic data.

5. The seismic exploration system based on the underwater mobile platform of claim 1, wherein the sound source host comprises:
   a central controller, a charging control circuit, a sampling circuit, a discharge switch control circuit, a serial interface, and a photoelectric isolation interface which are all connected to the central controller, a boost rectifier charging circuit, an energy-storage capacitor bank, and an all-solid-state discharge switch;
   wherein the energy-storage capacitor bank is connected to the boost rectifier charging circuit, the all-solid-state discharge switch, and the sampling circuit respectively, the boost rectifier charging circuit is connected with the charging control circuit, the all-solid-state discharge switch is connected with the discharge switch control circuit, the all-solid-state discharge switch is connected with the photoelectric junction box, and both the serial interface and the photoelectric isolation interface are connected with the multi-channel underwater acoustic data acquisition device;
   the central controller is configured to control the charging control circuit to start or end charging, and to control the discharge switch control circuit to close the discharge switch;
   the boost rectifier charging circuit is configured to charge the energy-storage capacitor bank;
   the energy-storage capacitor bank consists of multiple pulse energy-storage capacitors;
   the all-solid-state discharge switch is configured to realize a monopulse rapid discharge of the energy-storage capacitor bank;
   the charging control circuit is configured to start or stop charging according to a command from the central controller;
   the sampling circuit is configured to conduct partial pressure sampling of the voltage of the energy-storage capacitor bank, so as to obtain a capacitor voltage value and transmit the capacitor voltage value to the central controller;
   the discharge switch control circuit is configured to control electric energy release of the energy-storage capacitor bank;
   the serial interface is configured for the communication between the sound source host and the multi-channel underwater acoustic data acquisition device;
   the photoelectric isolation interface is configured to receive an external trigger signal and send the external trigger signal to the central controller; and
   the wireless network interface is configured to receive a sound source parameter set by a user, and transmit the sound source parameter to the central controller, wherein the sound source parameter comprises excitation energy, a working mode, an excitation interval, and a work schedule, and the wireless network interface is a Bluetooth interface or a WIFI interface.

6. The seismic exploration system based on the underwater mobile platform of claim 2, wherein the multi-electrode emission array comprises a high-voltage electrode array, a metal frame, a sound-permeable pressure-resistant barrel, and a first buoyancy column, a second buoyancy column, a high pressure adapter box, and an electrolyte solution;
   the sound-permeable pressure-resistant barrel is filled with the electrolyte solution, and the high-voltage electrode array and the metal frame are both immersed in the electrolyte solution, the high-voltage adapter box is located on the upper portion of the sound-permeable pressure-resistant barrel, the first buoyancy column is located at the head end of the sound-permeable pressure-resistant barrel, the second buoyancy column is located at the tail end of the sound-permeable pressure-resistant barrel, both the first buoyancy column and the second buoyancy column are connected fixedly with the sound-permeable pressure-resistant barrel, the high-voltage electrode array is connected with a high-potential wire, and the metal frame is connected with a zero-potential wire;

the high-voltage electrode array comprises multiple high-voltage discharge electrodes which serve as a high-voltage potential for discharge of the multi-electrode emission array;

the metal frame is used as a zero potential of discharge of the multi-electrode emission array;

the sound-permeable pressure-resistant barrel is configured to isolate from a deep-water environment under a high hydrostatic pressure, so that the high-voltage electrode array and the metal frame are in a normal pressure environment;

the first buoyancy column and the second buoyancy column are both configured to offset the weights of the high-voltage electrode array and the metal frame;

the electrolyte solution is configured as a discharge channel between the high voltage potential and the zero potential of the multi-electrode emission array; and the high-voltage adapter box is configured to adapt a high voltage.

7. The seismic exploration system based on the underwater mobile platform of claim 2, wherein the multi-channel hydrophone linear array comprises a photoelectric conversion package, a front elastic section, a working section, a digital package, and a rear elastic section;

wherein the photoelectric composite cable is connected with the front elastic segment through the photoelectric conversion package, the front elastic segment is connected with the working segment through the digital package, multiple working segments are connected with each other through the digital package, and the working segment is connected with the rear elastic segment through the digital package;

the photoelectric conversion package is configured to convert the seismic data acquired by the multi-channel hydrophone linear array and the state information thereof into a fiber-optic signal, and to convert the control information sent by the multi-channel underwater acoustic data acquisition device to the multi-channel hydrophone linear array into an electrical signal;

the front elastic section is configured to isolate from the mechanical vibration generated by the underwater mobile platform and the multi-electrode emission array, and the working segment comprises multiple hydrophones for acquiring a hydroacoustic signal and converting the hydroacoustic signal into an analog electrical signal;

the digital package is configured to convert the analog electrical signal into a digital electrical signal; and the rear elastic section is configured to isolate from the noise at the tail portion.

8. The seismic exploration system based on the underwater mobile platform of claim 6, wherein the material of the sound-permeable pressure-resistant barrel is a carbon fiber material; and the materials of both the first buoyancy column and the second buoyancy column are glass-bead buoyancy materials.

9. The seismic exploration system based on the underwater mobile platform of claim 7, wherein the multi-channel hydrophone linear array further comprises a drag parachute, the drag parachute is connected with the rear elastic section so as to maintain the attitude of the multi-channel hydrophone linear array.

10. The seismic exploration system based on the underwater mobile platform of claim 2, wherein the add-on type electronic cabin, the underwater mobile platform and the photoelectric composite cable are all connected through a watertight connector.

* * * * *